Patented July 15, 1947

2,424,082

UNITED STATES PATENT OFFICE 2,424,082

ALUMINA LOW SILICA REFRACTORY

Theodore Estes Field, Louisville, Ky., assignor to Corhart Refractories Company, Louisville, Ky., a corporation of Delaware No Drawing. Application April 10, 1945, Serial No. 587,615

4 Claims. (Cl. 106—57)

The tremendous increase in demand for magnesium and its alloys has emphasized the unsatisfactory performance of presently available refractories for melting and containing the molten metals. It is an object of this invention to disclose a novel heat cast refractory which has proven to be especially serviceable for such uses. By heat cast is meant the complete melting of the ingredients as for example with the techniques disclosed in U. S. Patent 1,615,750 to Fulcher, and shaping into the desired form by casting into molds and solidifying.

The chemical attack by magnesium results from reduction of the oxides of the refractory to metal and simultaneous oxidation of the magnesium to magnesium oxide. In the case of burnt refractories which always have appreciable porosity penetration of magnesium into the pores accelerates this attack. Refractory oxides with the exception of magnesium oxide itself are all subject to some extent to such attack and unfortunately the high melting point of MgO precludes its commercial utilization in the form of a non porous heat cast refractory. I have discovered however that well developed crystals of $Al_2O_3$ (corundum) which can be produced in a heat cast refractory are relatively slowly attacked despite the ready reducibility of this oxide reported in the literature.

The melting point of $Al_2O_3$ (2050° C.) is within commercial ranges and since the pure oxide is available in large quantities from the Bayer process, a non porous heat cast refractory of pure $Al_2O_3$ would appear to be a practical solution to the problem. Because of the high melting point involved however, articles cast from this composition are subjected to high tensile strains in the outer portions which despite the most careful insulation cool more rapidly than the interior of the castings, and the frequency with which this tensile strain exceeds the breaking stress makes commercial production discouraging. A more particular object of the present invention therefore is to disclose a successful modification of a high alumina composition which will at the same time preserve when desirable a maximum alumina content and yet permit commercial recovery of the castings by present techniques of casting in molds which may be of sand and annealing while insulated for example by diatomaceous earth.

Since such factors as coefficient of thermal expansion, thermal conductivity, specific heat and diffusivity are not capable of significant alteration for a given composition, the most practical source of relief from cracking is to lower the elastic constants of the casting. In practice, minor oxide additions particularly if $SiO_2$ is included are likely not to crystallize with the major phase or phases but to remain as an amorphous glassy matrix. I have found that the elastic constants and more practically the tendency of a given heat cast refractory to crack can be profoundly affected by minor oxide additions constituting, with part of the major oxide, such glassy matrices. It will be recognised that the cooling cycle is limited by the supply of heat in the casting and the ability to retain it by insulation. As a result, different sizes of castings have different cooling cycles and are differently subjected to tensile strains and may also differ somewhat in the extent of crystallization, the glassy phase being larger in the smaller castings. It is therefore desirable that the oxide additions be not too critical but on the contrary be able to care for a variety of situations.

Inclusion of silica and alkali or alkaline earth metal oxides are beneficial under some circumstances but these simpler systems are not satisfactory in other cases. As complexity increases, the number of glassy matrices available becomes almost infinite but all are limited by the fact that in a high corundum composition they will be saturated or supersaturated with alumina and are also limited in the extent to which various oxides may be added without exceeding their own solubility in the matrix and ceasing to importantly affect its properties by depositing the excess as an additional crystal phase. Since the compositions of such matrices are quite unlike normal glasses or slags, little or nothing has been published on their properties and search for satisfactory compositions is necessarily on a trial and error basis.

Among numerous tests, I have found one complex matrix system however which has unique properties and which will be discussed in detail. The necessary oxides in this matrix besides $Al_2O_3$ were found to be $ZrO_2$, MgO and $SiO_2$ with alkali metal oxide desirable but optional. I have further discovered that even $Fe_2O_3$ and $TiO_2$ in the amounts normally present in the usual commercial raw materials do not destroy the effectiveness of this type of matrix in preventing cracking in the castings.

Tests were made by casting 4½" x 2½" x 9" bricks in sand molds 1¼" thick and annealing the casting with mold in place in an excess of diatomaceous earth known commercially as Silocel. Under these circumstances the presence of 2% or 10% SiO₂; 1% Na₂O; 2%, 5%, 8% or 10% MgO; 2% BaO; or 7.6% ZrO₂ each per se proved unsatisfactory. Illustrative results with more complex systems with SiO₂ are given in the following table:

| Melt | Al₂O₃ | SiO₂ | Na₂O | MgO | CaO | SrO | BaO | ZrO₂ | Brittle or Cracked |
|---|---|---|---|---|---|---|---|---|---|
| 1 | 97.0 | 2 | 1 | | | | | | yes. |
| 2 | 90.0 | 5 | | 5 | | | | | yes. |
| 3 | 97.0 | 1 | | | 2 | | | | yes. |
| 4 | 97.0 | 2 | | 1 | | | | | yes. |
| 5 | 96.0 | 2 | | 2 | | | | | yes. |
| 6 | 95.0 | 4 | | 1 | | | | | yes. |
| 7 | 89.8 | 4.8 | | 5.4 | | | | | yes. |
| 8 | 93.0 | 5.0 | | 2 | | | | | yes. |
| 9 | 92.5 | 6 | | 1.5 | | | | | yes. |
| 10 | 85.0 | 7.5 | | 7.5 | | | | | yes. |
| 11 | 98.0 | 1 | | | 1 | | | | yes. |
| 12 | 97.0 | 2 | | | 1 | | | | yes. |
| 13 | 90.0 | 8 | | | 2 | | | | yes. |
| 14 | 97.8 | 1.2 | | | | 1 | | | yes. |
| 15 | 90.0 | 8 | | | | 2 | | | yes. |
| 16 | 97.5 | 1 | | | | | 1.5 | | yes. |
| 17 | 97.8 | 1.2 | | | | | 1 | | yes. |
| 18 | 94.7 | 3 | | | | | 2.3 | | yes. |
| 19 | 90.0 | 8 | | | | | 2 | | yes. |
| 20 | 90.0 | 6.5 | | | | | | 3.5 | yes. |
| 21 | 90.0 | 3.3 | | | | | | 6.7 | yes. |
| 22 | 91.7 | 4.1 | 1.2 | | | | | 3.0 | yes. |
| 23 | 90.0 | 3.3 | | 4.1 | | | | 2.6 | no. |
| 24 | 88.8 | 3.5 | | 3.5 | | | | 4.2 | no. |
| 25 | 89.6 | 2.2 | | 5.9 | | | | 2.3 | no. |

It was found that inferior castings were obtained as long as single fluxes were present with SiO₂ but when MgO and ZrO₂ were both present with SiO₂ to give, with Al₂O₃, a four component matrix, good castings were obtained. In this matrix, substitution of Na₂O for MgO was unsuccessful as shown by melt 22 although I have found that addition of Na₂O to give a five component matrix appears to further increase the toughness of the castings. That MgO as a flux has peculiar virtues not possessed by the other alkaline earth metal oxides is shown in the following table:

| Melt | Al₂O₃ | SiO₂ | MgO | CaO | SrO | BaO | ZrO₂ | Na₂O | Cracked |
|---|---|---|---|---|---|---|---|---|---|
| 26 | 88.0 | 4.0 | 3.1 | 0.1 | | | 3.1 | 1.2 | no. |
| 27 | 87.7 | 4.1 | 0.4 | 2.9 | | | 3.1 | 1.2 | yes. |
| 28 | 88.2 | 4.1 | | 0.1 | 2.9 | | 3.1 | 1.2 | yes. |
| 29 | 88.2 | 4.1 | | | | 3.1 | 3.1 | 1.2 | yes. |

Substitution of CaO, SrO or BaO for MgO gave castings which actually broke into pieces during cooling.

The Na₂O for such batches may be conveniently added as soda ash, sodium silicate, sodium aluminate or feldspar. Feldspars are also obtainable which are high in K₂O rather than Na₂O and I have found that good castings can be made with K₂O rather than Na₂O added to the complex Al₂O₃-ZrO₂-MgO-SiO₂ matrices. Although more expensive at present and therefore not as practical, Li₂O may also be substituted for Na₂O with moderate success. This is illustrated in the following table:

| Melt | Al₂O₃ | SiO₂ | MgO | ZrO₂ | Na₂O | K₂O | Li₂O | Rating |
|---|---|---|---|---|---|---|---|---|
| 30 | 89.2 | 4.0 | 3.1 | 3.1 | | | | good. |
| 26 | 88.0 | 4.0 | 3.1 | 3.1 | 1.2 | | | excellent. |
| 31 | 88.0 | 4.2 | 3.1 | 3.1 | | 1.2 | | excellent. |
| 32 | 88.2 | 4.0 | 3.1 | 3.1 | | | 1.2 | good. |

While larger amounts of alkali metal oxide may be used to obtain tough castings, for most applications as a refractory the alkalies lower resistance and I therefore prefer to add them only when particularly tough castings are desired and then to limit the addition to around 1% although for special purposes as much as 3% can be safely added.

The ZrO₂ also contributes unique features as shown in the following table:

| Melt | Al₂O₃ | SiO₂ | MgO | Na₂O | TiO₂ | ZrO₂ | CeO₂ | Cracking |
|---|---|---|---|---|---|---|---|---|
| 33 | 87.2 | 4.0 | 3.1 | 1.1 | 3.3 | 0.4 | | yes. |
| 26 | 88.0 | 4.0 | 3.1 | 1.2 | 0.2 | 3.1 | | no. |
| 34 | 88.3 | 4.2 | 3.1 | 1.2 | | | 3.0 | yes. |

Both TiO₂ and CeO₂ which are in the same column of the periodic table with ZrO₂ produced broken castings in contrast to ZrO₂.

From the standpoint of resistance to molten magnesium, the siliceous matrix is a disadvantage and for that reason I prefer to limit the total additions to Al₂O₃ to about 15% and the SiO₂ to 5% although some improved recovery of castings continues with larger additions. On the other hand I have found that substantial amounts of additions must be made to give uniformly good results and that each of the three oxides MgO, ZrO₂ and SiO₂ must be individually present in significant amount. The effect of the total amount of additions is shown in the following table.

| Melt | Al₂O₃ | SiO₂ | MgO | ZrO₂ | Na₂O | Castings |
|---|---|---|---|---|---|---|
| 35 | 97.1 | 1.0 | 0.8 | 0.8 | 0.3 | bad. |
| 36 | 94.3 | 2.1 | 1.5 | 1.5 | 0.6 | bad. |
| 37 | 91.3 | 3.1 | 2.3 | 2.3 | 1.0 | fair. |
| 38 | 88.7 | 4.0 | 3.1 | 3.1 | 1.2 | good. |
| 39 | 85.3 | 4.9 | 3.9 | 4.9 |   | good. |

I have found that 8% total addition is about the minimum which can be safely used. The solubility of MgO and ZrO₂ in the matrix depends upon the amount of SiO₂ and alkali metal oxide present and for greatest efficiency in a high alumina melt these should not exceed the saturation amounts.

These are readily determined for the particular conditions used by examining the product petrographically for crystals of ZrO₂ or magnesium spinel. In general, I have found equal additions of MgO and ZrO₂ quite satisfactory. Further good compositions are illustrated in the following table:

| Melt | Al₂O₃ | SiO₂ | MgO | ZrO₂ |
|---|---|---|---|---|
| 40 | 90.5 | 1.8 | 3.5 | 4.2 |
| 41 | 89.4 | 4.1 | 3.4 | 3.1 |
| 42 | 88.0 | 3.9 | 5.0 | 3.1 |
| 43 | 88.3 | 4.9 | 1.9 | 4.9 |
| 44 | 88.3 | 4.9 | 4.9 | 1.9 |

These relatively pure compositions can be conveniently obtained using zircon as source of zirconia which then also contributes a lesser amount of silica. The silica can be conveniently supplemented from high grade kyanite, a siliceous calcined magnesite, talc, feldspar or, less economically, as quartz sand. Because of the small amount of calcined magnesite or talc required, a normal inclusion of CaO found therein is not harmful although materials high in this impurity should be avoided for greatest efficiency. The alumina may be supplied in the form commonly used for metal production by electrolysis.

While the above compositions have been made with relatively pure materials to withstand the most severe service, I have found that the Fe₂O₃ and TiO₂ impurities of cheaper commercial aluminous ores do not seriously interfere with the properties of the glass phase which permit recovery free from cracks. Thus where the intended use of the product does not justify the expense of pure materials, the cost can be reduced by substituting at least in part, bauxite or by-product alumina for the pure alumina. Good castings were obtained for example by melting the following compositions:

| Melt | Al₂O₃ | SiO₂ | CaO | MgO | ZrO₂ | Fe₂O₃ | TiO₂ | Na₂O |
|---|---|---|---|---|---|---|---|---|
| 45 | 85.8 | 4.5 | .1 | 3.9 | 3.8 | .5 | 1.0 | .4 |
| 46 | 85.0 | 4.0 | .1 | 3.8 | 4.0 | 1.0 | 2.0 | .2 |
| 47 | 85.1 | 3.0 | .2 | 2.6 | 2.9 | 3.0 | 3.0 | .2 |

The iron oxide is appreciably reduced by the carbon electrodes during melting and the titania easily exceeds its solubility in the residual matrix and appears as another crystal phase. Nevertheless a definite tendency toward brittleness was noted with 5% titania and higher amounts produce cracking. For the best results I prefer therefore to select raw materials in such a way that iron oxide and titania are each kept below 3%.

While 1.9% ZrO₂ is about the least which can be included if crack free castings are to be obtained, this oxide has a low solubility in the complex glass phase and in some circumstances crystals begin to separate when 5% ZrO₂ is reached. For compositions high in corundum therefore, I prefer to stay within these limits. For use in some alloys of magnesium however the zirconia crystals are not objectionable despite the ready reducibility of this oxide reported in the literature. I have found that larger additions of zirconia, with silica kept below 5%, do not produce cracking as found for its analogue, titania, but even 40% zirconia can be added to give good castings. Since the interlocking crystal structure obtained with two crystal phases contributes to the strength and since a satisfactory grade of baddeleyite ore for the purpose can be obtained more cheaply than the pure alumina it displaces, I prefer to use this system wherever equally satisfactory service results.

Heat cast refractories in the zirconia-alumina system also show excellent corrosion resistance to molten glass as disclosed in my U. S. Patent 2,271,366. Products with 10%–13% SiO₂ and with Na₂O as flux are now widely used in the glass industry. In the newer application of electricity to the melting of glass however, considerable trouble has been experienced due to such refractories becoming electrically conducting at the elevated temperatures involved. Since the conductivity increases with temperature, the resistance heat developed starts off a vicious cycle which may result in destruction of the refractory. There are a number of factors to be considered in the electrical conductivity of refractories such as amount of liquid phase formed at the given temperature, its chemical composition, its viscosity, the rate of solution of crystals in the glass phase as temperature is raised, etc., all of which make prediction at present impossible. As a practical matter, I have discovered however that reduction of silica to 5% and the substitution of 2% MgO for Na₂O in the 20% zirconia-corundum system will increase electrical resistance at 1500° C. by a factor of 10. The higher zirconia types of my improved refractory are therefore useful in the electric glass industry, where the greater electrical resistance is combined with the greater corrosion resistance due to ZrO₂.

From the cracking standpoint I have found, as in the simpler corundum system, that MgO plays a unique part in the complex glass phase, now saturated with ZrO₂ as well as Al₂O₃. This is illustrated in the following tables:

| Melt | ZrO₂ | Al₂O₃ | SiO₂ | MgO | CaO | Na₂O | K₂O | Fe₂O₃ | TiO₂ | Cracks |
|---|---|---|---|---|---|---|---|---|---|---|
| 48 | 18.9 | 74.2 | 5.0 | 1.0 | 0.0 |   |   | 0.7 | 0.2 | yes. |
| 49 | 18.9 | 73.8 | 5.0 | 1.4 | 0.0 |   |   | 0.7 | 0.2 | partial. |
| 50 | 18.9 | 73.3 | 5.0 | 1.9 | 0.0 |   |   | 0.7 | 0.2 | no. |
| 51 | 18.9 | 73.1 | 5.0 | 0.2 | 1.9 |   |   | 0.7 | 0.2 | yes. |

| Melt | ZrO₂ | Al₂O₃ | SiO₂ | SrO | BaO | Na₂O | K₂O | Fe₂O₃ | TiO₂ | Cracks |
|---|---|---|---|---|---|---|---|---|---|---|
| 52 | 18.9 | 73.1 | 5.0 | 2.1 | | | | 0.7 | 0.2 | yes. |
| 53 | 18.9 | 73.3 | 5.0 | | 1.9 | | | 0.7 | 0.2 | yes. |
| 54 | 18.9 | 73.9 | 5.0 | | | 1.3 | | 0.7 | 0.2 | yes. |
| 55 | 39.5 | 51.8 | 5.0 | | | 1.3 | | 1.9 | 0.5 | yes. |
| 56 | 18.9 | 73.8 | 5.0 | | | | 1.4 | 0.7 | 0.2 | yes. |

It is seen that with silica as low as 5% neither the alkali metal oxides nor the alkaline earth metal oxides with the exception of MgO are able to prevent cracking. Furthermore even MgO must be present to the extent of at least 1.4% to prevent cracking.

On the other hand I have found that the amount of MgO beyond the minimum is not critical as shown in the following melts.

| Melt | ZrO₂ | Al₂O₃ | SiO₂ | MgO | Fe₂O₃ | TiO₂ | CaO | Cracks |
|---|---|---|---|---|---|---|---|---|
| 50 | 18.9 | 73.3 | 5.0 | 1.9 | 0.7 | 0.2 | | no. |
| 57 | 18.9 | 70.8 | 5.0 | 4.3 | 0.7 | 0.2 | 0.1 | no. |
| 58 | 18.9 | 68.8 | 5.0 | 6.3 | 0.7 | 0.2 | 0.1 | no. |

Depending upon the silica and impurities present, MgO will also reach its saturation value as the amount increases and will separate as magnesium spinel. For some purposes the magnesium spinel phase is not objectionable but unless this is known to be the case I prefer to use less than 7% MgO. Whether or not spinel is separating can be readily determined petrographically and unnecessary excesses thus avoided. If sand molds are used for the castings it is of definite advantage to keep MgO low to prevent burning in.

Other satisfactory compositions are given below.

| Melt | ZrO₂ | Al₂O₃ | SiO₂ | MgO | Na₂O | Fe₂O₃ | TiO₂ | CaO |
|---|---|---|---|---|---|---|---|---|
| 59 | 8.8 | 83.6 | 1.5 | 4.4 | 1.0 | 0.5 | 0.1 | 0.1 |
| 60 | 29.9 | 61.7 | 5.0 | 2.4 | | 0.7 | 0.3 | |
| 61 | 40.0 | 52.0 | 5.0 | 2.4 | | 0.3 | 0.3 | |

I have found that when ZrO₂ is increased to 40%–45% the tolerance for Fe₂O₃ and TiO₂ decreases considerably and it is necessary to use relatively pure materials for such batches. With higher ZrO₂, small castings are likely to crack regardless of the purity of the materials.

While various preferred batch materials have been pointed out, it is obvious that in such a process where complete melting occurs, all peculiar properties of individual raw materials are obliterated and any combination of raw materials can be used which together will yield a chemical composition within the indicated limits.

By "principally" in the following claims I mean over 95% of the total composition.

What I claim is:

1. A heat cast refractory composed of indigenous crystals in an amorphous matrix and analytically containing 45% to 92% alumina, 1.9% to 40% zirconia, 1.5% to 5% silica, 1.4% to 7% magnesia, 0% to 3% alkali metal oxide, 0% to 3% iron oxide and 0% to 5% titania, the total percentage of said ingredients being at least 95%.

2. A heat cast refractory comprising indigenous corundum crystals in an amorphous matrix and analytically containing principally 85% to 92% alumina, 1.9% to 5% zirconia, 1.5% to 5% silica, 1.9% to 7% magnesia, 0% to 3% alkali metal oxide, 0% to 3% iron oxide and 0% to 5% titania.

3. A heat cast refractory comprising indigenous crystals of corundum and zirconia in an amorphous matrix and analytically containing principally 45% to 92% alumina, 5% to 40% zirconia, 1.5% to 5% silica, 1.4% to 7% magnesia, 0% to 3% alkali metal oxide, 0% to 3% iron oxide and 0% to 5% titania.

4. A heat cast refractory comprising indigenous crystals of corundum and zirconia in an amorphous matrix and analytically containing principally 45% to 92% alumina, 5% to 40% zirconia, 1.5% to 5% silica, 1.4% to 7% magnesia, 0% to 3% iron oxide and 0% to 5% titania.

THEODORE ESTES FIELD.

REFERENCES CITED

The following references are of record in the file of this patent:

UNITED STATES PATENTS

| Number | Name | Date |
|---|---|---|
| 2,271,366 | Field | Jan. 27, 1942 |